DE WITT C. COOKINGHAM & J. H. HERTNER.
AUTOMOBILE RUNNING GEAR.
APPLICATION FILED OCT. 3, 1911.
1,138,732.
Patented May 11, 1915.
3 SHEETS—SHEET 1.
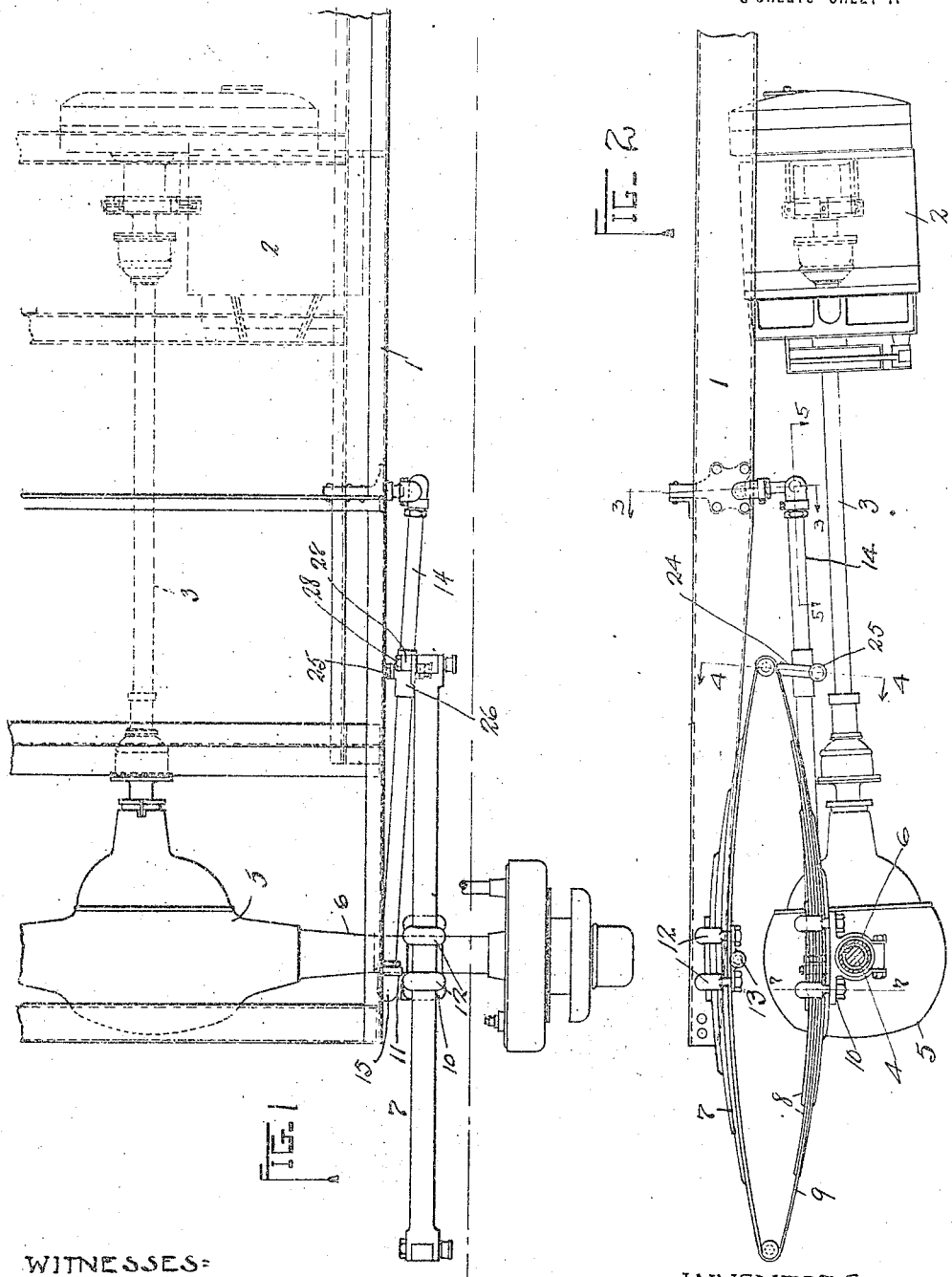
WITNESSES:
INVENTORS-
De Witt C. Cookingham
and John H. Hertner
by J. B. Fay
ATTORNEY

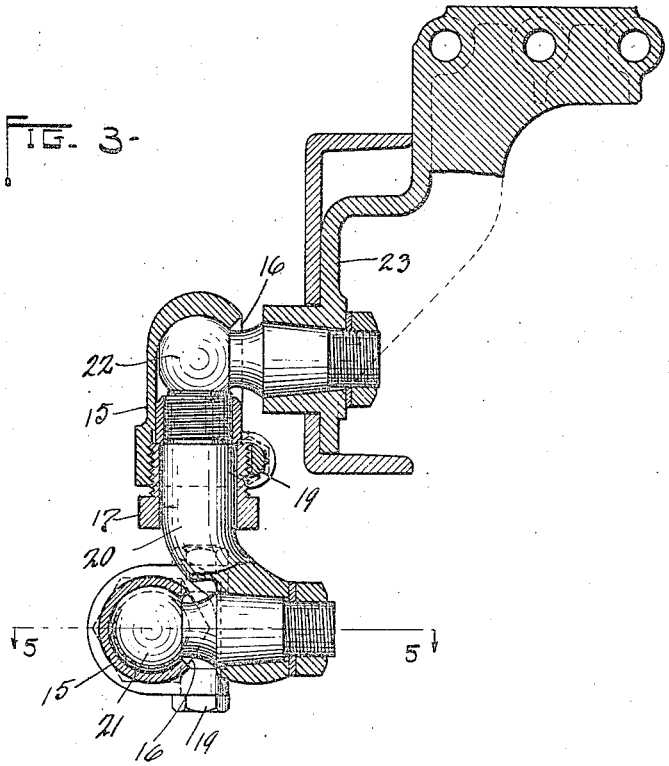
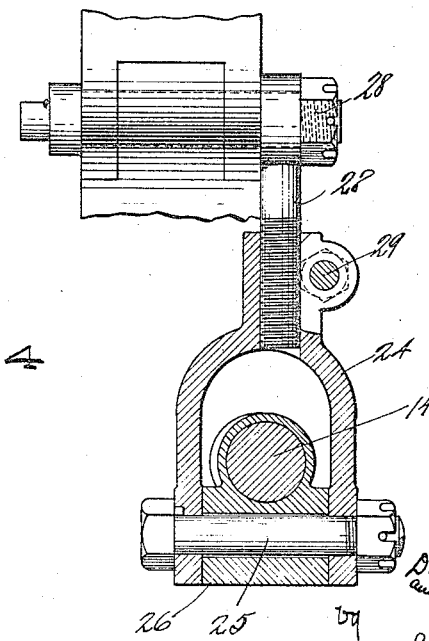

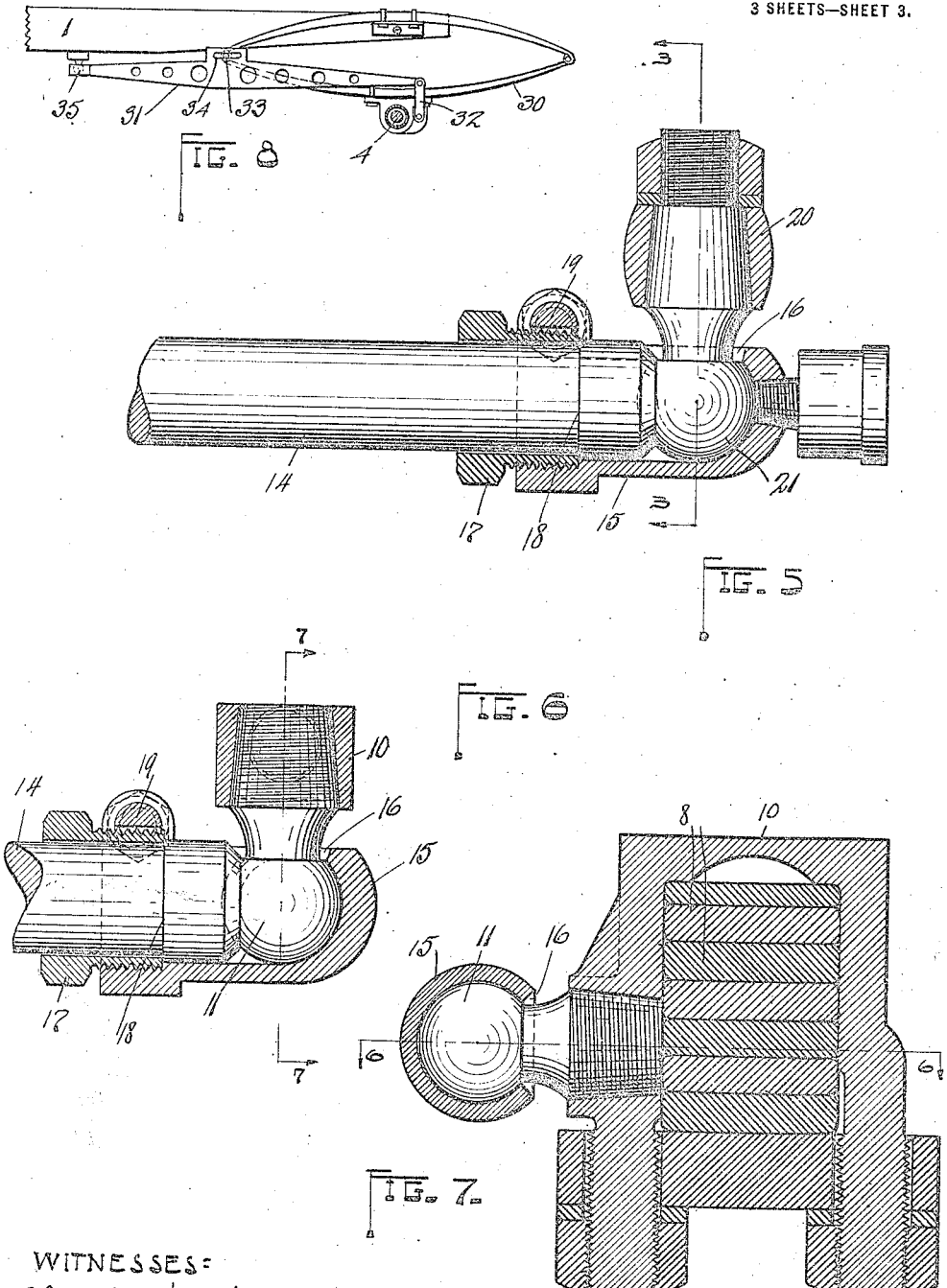

UNITED STATES PATENT OFFICE.

DE WITT C. COOKINGHAM AND JOHN H. HERTNER, OF CLEVELAND, OHIO, ASSIGNORS TO THE RAUCH AND LANG CARRIAGE COMPANY, OF CLEVELAND, OHIO, A CORPORATION OF OHIO.

AUTOMOBILE RUNNING-GEAR.

1,138,732.      Specification of Letters Patent.      Patented May 11, 1915.

Application filed October 3, 1911. Serial No. 652,561.

*To all whom it may concern:*

Be it known that we, DE WITT C. COOKINGHAM and JOHN H. HERTNER, citizens of the United States, and residents of Cleveland, county of Cuyahoga, and State of Ohio, have jointly invented a new and useful Improvement in Automobile Running-Gears, of which the following is a specification, the principle of the invention being herein explained and the best mode in which we have contemplated applying that principle, so as to distinguish it from other inventions.

The present invention in part comprehends one of the several specific forms of vehicle running gear shown and described in our co-pending application filed November 30, 1910, Serial No. 594,981. In addition various details of improvement are comprehended, all having as their object the provision of means whereby the rear axle in a shaft driven motor vehicle may be connected with the frame, or chassis, of the vehicle so as to allow the springs full freedom of action and still allow the use of said springs as distance rods and to take up any turning torque imparted to the casing in which the rear axle is housed. This result we accomplish, in general, by supporting the vehicle frame upon said axle by means of an elliptic spring and then connecting one end of said spring, preferably, of course, the front end, with said frame through a member which is also connected with the axle to move in unison therewith; so that, while the rear axle may push through the spring in order to propel the vehicle, and the housing on said axle be held against rotating despite any torque imparted thereto by the driving or braking mechanism, said spring will nevertheless have the same freedom of movement which it would have if distance and torsion rods were employed as usually is done in vehicles of the general class described. To the accomplishment of the foregoing and related ends said invention then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a broken plan view of the chassis of a motor vehicle wherein have been incorporated our present improvements; Fig. 2 is a side elevation of the same; Fig. 3 is a section of a detail, the plane of the section being indicated by the line 3—3, Fig. 2; Fig. 4 is a similar sectional detail taken on the line 4—4, Fig. 2; Fig. 5 is a section of the detail shown in Fig. 3 taken on the plane indicated by the line 5—5 in said figure; Figs. 6 and 7 are sectional views of another detail taken at right angles to each other; and Fig. 8 is a side elevational view, more or less diagrammatic in character, illustrating a modified form of construction.

The chassis illustrated in Figs. 1 and 2, as well as in the modified form of construction represented in Fig. 8, is shown as of typical form with straight side members 1, but obviously drop frames or other of the various types of frames in current use in automobile construction may be employed. Similarly, the form of the motor 2, whether electric as shown or not, together with its suspension and the driving connections 3 from said motor to the rear axle 4, may be varied without departing from the spirit of the invention. In the present case, such rear axle is a live axle driven through a differential of the usual construction that is housed in an enlargement 5 of the casing 6, within which such axle is contained. Of the rear springs, the mounting and connections of which are of present interest, only one is shown, it being understood that the other will be mounted and connected in the same fashion. Such spring 7 is of full elliptic form, and preferably has its lower half of heavier construction than its upper half (see Fig. 2). Such increase in the strength of the lower spring half, we furthermore, prefer to secure by employing additional leaves 8, rather than making the leaves heavier and such additional leaves are disposed on the inside and not on the outside of the main leaf 9, which extends from end to end of the spring. Before assembling the spring such inner, supplementary leaves 8 are substantially straight, so that a maximum tension effect will be secured when they are drawn to conform to the curve of the spring. The lower half of the assembled spring is securely clamped to the casing 6, or rather to a seat thereon, by means of clips 10 of usual construction, save for the provision on the inside face of one of said clips of a lug 11 in the form of a ball for a ball and socket joint connection which will be presently described (see Fig. 6). The leaves of the upper half of said spring are held in a clamp 12, which is pivotally secured by means of a pin 13 to the side member of the chassis or the vehicle frame, thus leaving the spring as a whole free to oscillate about the axle 4.

The lug 11, previously referred to as extending from the side of the spring-clip 10, serves as a means for attaching to said clip, and thus to the casing and axle, the rear end of a strut member in the form of a rod or bar 14, the forward end of which is connected with the vehicle frame at a point spaced from the point of attachment of the spring thereto, and preferably forwardly of the front end of said spring. To connect the rear end of the rod 14 with the lug on the spring clip 10, the rod terminates in a spherical concavity adapted to fit over the round ball-like end of said lug, and is held in suitable bearing contact therewith by means of a socket 15. This socket, which is formed on one side with a slot 16 for the body of the lug, is adjustably secured to the rod end by means of a bushing or sleeve 17 interiorly threaded into said socket and itself adapted to bear against a shoulder 18 on the rod. A transversely disposed clamp bolt 19 across the slotted side of the socket serves to lock said socket and sleeve in adjusted position. The sleeve is preferably loosely fitted upon the rod so that the ball may freely center itself in the opposed concave bearings provided by said socket and the end of the rod. All tendency to bind is thus avoided, while by having the slot in the side of the sleeve of sufficient width the joint is made strictly universal, as should be obvious.

The forward end of the rod 14 is secured to the frame by means of a link 20, that carries a spherical headed stud 21, said rod being joined thereto by a ball-and-socket joint similar to the one just described, while another ball-and-socket joint is utilized to secure the upper end of the link to the vehicle frame or rather to a stud 22 mounted on a bracket 23 on said frame (see Figs. 3 and 5), and having a spherical head as in the case of the lug on the spring seat just referred to. The other parts of these two joints, which correspond with the parts of the previously described joint at the rear end of the rod, are correspondingly numbered, and do not require to be further described. The forward end of the spring, then, is connected to said bar by means of a second link of adjustable length, the construction of which is shown in Fig. 4. This link consists of a yoke 24, that spans the rod and is pivotally secured thereto about an axis transverse to the axis of said rod by means of a bolt 25 passing through a block or center-support 26 fixedly secured on said rod. In the upper end of the yoke is threaded an eye-bolt 27, the eye of which is hung from the spring bolt 28 at the forward end of the spring, such latter bolt being of sufficient length for this purpose. When detached from the spring bolt, the eye-bolt may be rotated and the length of the link connection between the spring and the bar thus varied as desired. A clamp bolt 29 in the yoke 24 serves to lock it and the eye-bolt together in desired adjusted relation.

No note has been taken in the foregoing description of the several detailed parts of the means for lubricating the various joints involved, although oil-cups are shown in several instances. It will be understood that these, or equivalent means, are provided in connection with each such joint.

By the foregoing construction, not only are all of the advantages referred to in our co-pending application secured, but in addition, owing to the provision of universal joints at the point of connection between the rear end of the bar 14 and the rear axle, or axle housing, and between the link 20 and the forward end of such bar and the frame, respectively, a range and freedom of movement for the bar is obtained, sufficient to take care of all displacement and distortion to which it may be subjected, it being remembered that owing to the two wheels on the rear axle being differently affected by inequalities in the road the axle is frequently turned about an axis longitudinally of the vehicle. Moreover, in the present improved construction we provide, as has been noted, an adjustable link for connecting the forward end of the spring with said bar. This adjustment is of service not only in taking up wear, should the latter occur, but also, in the assembly of the chassis, it provides for the slight variations that are found in the form and tilt of the springs, it being very difficult to so accurately form these as to render them strictly interchangeable. The use of the additional leaves 8 in conjunction with the lower halves of the respective elliptic springs 7 reinforces such lower halves, rendering them considerably heavier than the upper halves of said springs. This is desirable for it will be noted that it is the lower half of each spring, and more especially the forward section of such lower half that actually takes up the greater portion of the turning torque of the rear axle housing and which likewise has to resist the tendency on the part of said housing to shift its position longitudinally of the vehicle frame.

A further feature to be noted in connection with the present construction, is the disposition of the point of connection of the rear end of the rod 14 with the axle, or specifically with the spring clip 10, (through which, together with the housing, said rod is connected to the axle) to the rear of said axle, it being noted that the lug 11 is carried by the rearmost of the two spring-clips 10. By this arrangement, the tendency which the housing may manifest to rotate about said axle, owing to the driving or braking torque, is restrained by the opposing pressure of the strut rod, such tendency to turn being impressed upon the rod through the spring and the link connecting the forward end of the latter with said rod; whereas with such point of attachment in front of the axle, the two tendencies are combined thus causing a correspondingly greater displacement of the axle housing and derangement of the driving connection 3.

In the remaining figure of the drawings, viz., Fig. 8, is shown one of the forms of construction illustrated in our co-pending application and forming in a sense the basis of the improved construction hereinbefore described. Thus, this former construction shows a spring 30 similarly mounted on the rear axle 4 and having its forward end connected to a bar 31 that is attached at its rear end to the rear of the axle. Such attachment, however, in this case is by means of a link 32 instead of directly through a ball and socket joint to the spring seat, and the forward end of the spring, conversely, instead of having a linked connection to the bar, is secured thereto by means of a pin 33 sliding in a slot 34 in said bar. A simple ball-and-socket joint 35 serves to connect the forward end of the bar with the frame. This construction will illustrate how, so far as the general features of construction herein shown and described are concerned, the pin and slot type of connection may be substituted for the link connection, although it does not lend itself so readily to the construction of a universal joint, such as is desirable both at the forward and rear ends of the rod.

Other modes of applying the principle of my invention may be employed instead of the one explained, change being made as regards the mechanism herein disclosed, provided the means stated by any of the following claims or the equivalent of such stated means be employed.

We therefore particularly point out and distinctly claim as our invention:—

1. In a vehicle, the combination of the vehicle frame; a wheel axle; a housing for said axle; an elliptic spring supporting said frame upon said housing; a member connected with said housing and with said frame at a point spaced from the point of connection of said spring thereto, said member being thus connected with said frame by a ball and socket joint; and a linked connection between one end of said spring and said member.

2. In a vehicle, the combination of the vehicle frame; a wheel axle; a housing for said axle; an elliptic spring supporting said frame upon said housing; a member connected with said housing and with said frame at a point spaced from the point of connection of said spring thereto, said member being thus connected with said frame and housing by ball and socket joints; and a linked connection between one end of said spring and said member.

3. In a vehicle, the combination of the vehicle frame; a wheel axle; an elliptic spring supporting said frame upon said housing; a rigid member connected at one end with said housing; a link connecting the other end of said member with said frame at a point spaced from the point of attachment of said spring to said frame; and a link connecting one end of said spring to said member, said link including a yoke pivotally secured to said member about a transverse axis, and an eye-bolt adjustably threaded in said yoke at one end and secured to the spring bolt at its other.

4. In a vehicle, the combination of the vehicle frame; a wheel axle; a housing for said axle; an elliptic spring supporting said frame upon said housing; a rigid member connected at one end with said housing by a ball and socket joint; a link connecting the other end of said member with said frame at a point spaced from the point of attachment of said spring to said frame, said link being thus connected by a ball and socket joint with both said member and frame; and a link connecting one end of said spring to said member.

5. In a vehicle, the combination of the vehicle frame; a wheel axle; a housing for said axle; an elliptic spring supporting said frame upon said housing; a rigid member connected at one end with said housing at a point to the rear of said axle and at its other end to said frame at a point in front of the point of attachment of said spring to said frame; and a connection between the forward end of said spring and said member.

6. In a vehicle, the combination of the vehicle frame; a wheel axle; a housing for said axle; an elliptic spring supporting said frame upon said housing; a rigid member connected at one end with said housing at a point to the rear of said axle and at its other end to said frame at a point in front of the point of attachment of said spring to said frame; and a linked connection between the forward end of said spring and said member.

7. In a vehicle, the combination of the vehicle frame; a wheel axle; a housing for said axle; an elliptic spring supporting said frame upon said housing; a rigid member connected at one end with said housing at a point to the rear of said axle; a link connecting the other end of said member with said frame at a point in front of the point of attachment of said spring to said frame; and an adjustable link connecting the forward end of said spring to said member.

8. In a vehicle, the combination of the vehicle frame; a wheel axle; a housing for said axle; an elliptic spring supporting said frame upon said housing; a rigid member connected at one end with said housing at a point to the rear of said axle by a ball and socket joint; a link connecting the other end of said member with said frame at a point in front of the point of attachment of said spring to said frame, said link being thus connected by a ball and socket joint to both said member and frame; and a link connecting one end of said spring to said member.

9. In a vehicle, the combination of the vehicle frame; a wheel axle; a housing for said axle; an elliptic spring supporting said frame upon said housing; a lug with a spherical head on said housing adjacent to said spring; a rigid member connected at one end with said frame and having its other end provided with a spherical recess adapted to bear against said lug and with an oppositely directed shoulder; a socket fitted over said lug; a sleeve on said member adapted to engage the shoulder thereon, said sleeve having threaded engagement with said socket; and means connecting one end of said spring with said member.

10. In a motor vehicle, the combination of the vehicle frame; a wheel axle; a housing for said axle; an elliptic spring supporting said frame upon said housing; a lug with a spherical head on said housing adjacent to said spring; a rigid member connected at one end with said frame and having its other end provided with a spherical recess adapted to bear against said lug and with an oppositely directed shoulder; a socket fitted over said lug; a sleeve loosely fitting on said member and adapted to engage the shoulder thereon, said sleeve being threaded into said socket; and means connecting one end of said spring with said member.

11. In a motor vehicle, the combination of the vehicle frame; a driving wheel axle; a housing for said axle; a full elliptic spring supporting said frame upon said housing; and means connecting one end of said spring with said frame whereby any tendency on the part of said housing to turn or shift its position longitudinally of said frame may be taken up through said means and the lower half of said spring, the latter being reinforced so as to be heavier than the upper half, and thus be adapted to withstand any such turning or shifting strain, without detracting from the resilient action of the upper half of said spring.

12. In a motor vehicle, the combination of the vehicle frame; a driving wheel axle; a housing for said axle; a full elliptic spring supporting said frame upon said housing, the upper and lower halves of said spring consisting of main leaves extending the full length of the spring and shorter leaves on the outside of said main leaves, respectively; means connecting one end of said spring with said frame, whereby any tendency on the part of said housing to turn or shift its position longitudinally of said frame may be taken up through said means and such lower spring half; and additional short leaves on the inside of the lower half of such spring, whereby such lower spring half is made heavier than the upper half and thus adapted to withstand any such turning or shifting strain, without detracting from the resilient action of such upper half.

13. In a motor vehicle, the combination of the vehicle frame; a driving wheel axle; a housing for said axle; a full elliptic spring supporting said frame upon said housing, the upper and lower halves of said spring consisting of main leaves extending the full length of the spring and shorter leaves on the outside of said main leaves, respectively; means, including a link, connecting one end of said spring with said frame, whereby any tendency on the part of said housing to turn or shift its position longitudinally of said frame may be taken up through said means and such lower spring half; and additional short leaves on the inside of the lower half of such spring, whereby such lower spring half is made heavier than the upper half and thus adapted to withstand any such turning or shifting strain, without detracting from the resilient action of such upper half.

14. In a motor vehicle, the combination of the vehicle frame; a driving wheel axle; a housing for said axle; a full elliptic spring supporting said frame upon said housing, the upper and lower halves of said spring consisting of main leaves extending the full length of the spring and shorter leaves on the outside of said main leaves, respectively; a rigid member connected at one end with said housing and at the other end with said frame at a point spaced from the point of attachment of said spring to said frame; means connecting one end of said spring to said member whereby any tendency on the part of said housing to turn or shift its position longitudinally of said frame may be taken up through said means and such lower spring half; and additional short leaves on the inside of the lower half of such spring, whereby such lower spring half is made heavier than the upper half and thus adapted to withstand any such turning or shifting strain, without detracting from the resilient action of such upper half.

15. In a motor vehicle, the combination of the vehicle frame; a driving wheel axle; a housing for said axle; a full elliptic spring supporting said frame upon said housing, the upper and lower halves of said spring consisting of main leaves extending the full length of the spring and shorter leaves on the outside of said main leaves, respectively; a rigid member connected at one end with said housing and at the other end with said frame at a point spaced from the point of attachment of said spring to said frame; a link connecting one end of said spring to said member, whereby any tendency on the part of said housing to turn or shift its position longitudinally of said frame may be taken up through said means and such lower spring half; and additional short leaves on the inside of the lower half of such spring, whereby such lower spring half is made heavier than the upper half and thus adapted to withstand any such turning or shifting strain, without detracting from the resilient action of such upper half.

Signed by us, this 30th day of September, 1911.

DE WITT C. COOKINGHAM.
JOHN H. HERTNER.

Attested by—
ANNA L. GILL,
JNO. F. OBERLIN.